United States Patent
Monahan et al.

(10) Patent No.: US 12,304,623 B2
(45) Date of Patent: May 20, 2025

(54) BLENDED AIRSPEED TECHNIQUE FOR HELICOPTER CONTROL AT LOW AIRSPEEDS

(71) Applicant: LOCKHEED MARTIN CORPORATION, Bethesda, MD (US)

(72) Inventors: Jay Benjamin Monahan, Toms River, NJ (US); Erez Eller, Oakville, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 356 days.

(21) Appl. No.: 17/860,745

(22) Filed: Jul. 8, 2022

(65) Prior Publication Data

US 2024/0010330 A1  Jan. 11, 2024

(51) Int. Cl.
*B64C 27/00* (2006.01)
*B64D 45/00* (2006.01)
*G01P 5/16* (2006.01)

(52) U.S. Cl.
CPC .............. *B64C 27/00* (2013.01); *B64D 45/00* (2013.01); *G01P 5/16* (2013.01); *B64D 2045/0085* (2013.01)

(58) Field of Classification Search
CPC ................... B64C 27/00; B64D 45/00; B64D 2045/0085; G01P 5/16
See application file for complete search history.

(56) References Cited

U.S. PATENT DOCUMENTS

| | | | |
|---|---|---|---|
| 5,751,609 A | 5/1998 | Schaefer et al. | |
| 5,901,272 A | 5/1999 | Schaefer et al. | |
| 7,127,335 B2 | 10/2006 | Tschepen et al. | |
| 10,101,749 B1 | 10/2018 | Gillett et al. | |
| 10,345,327 B2 * | 7/2019 | Delporte | G01P 5/14 |
| 11,008,118 B2 | 5/2021 | Ueda et al. | |
| 2016/0023776 A1 * | 1/2016 | Ganguli | G01P 5/02 |
| | | | 701/14 |
| 2020/0023941 A1 * | 1/2020 | Gillett | B64C 13/503 |

FOREIGN PATENT DOCUMENTS

EP  2 669 687 B1  12/2013

OTHER PUBLICATIONS

Extended European Search Report on European Patent Application No. 23183814.5 dated Nov. 7, 2023 (9 pages).

* cited by examiner

*Primary Examiner* — Naeem Taslim Alam
(74) *Attorney, Agent, or Firm* — Foley & Lardner LLP

(57) ABSTRACT

A method for controlling a rotary wing aircraft includes determining a measured airspeed of the rotary wing aircraft based on data from a pitot probe, determining an estimated airspeed of the rotary wing aircraft based on rotor control commands, and determining a blended airspeed based on both the measured airspeed and the estimated airspeed.

19 Claims, 6 Drawing Sheets

BLENDED AIRSPEED TECHNIQUE FOR HELICOPTER CONTROL AT LOW AIRSPEEDS

STATEMENT REGARDING FEDERALLY SPONSORED RESEARCH OR DEVELOPMENT

This invention was made with Government support under Agreement No. W911W6-19-9-0005, awarded by the Army Contracting Command-Redstone Arsenal. The Government has certain rights in the invention.

FIELD

The present application relates generally to the field of measurements for a rotary-wing aircraft and, more particularly, to a method and a system for determining an airspeed of a helicopter at low airspeeds.

BACKGROUND

Airspeed of rotary-wing aircraft is typically measured using airspeed probes, such as pitot probes. Pitot probes function by comparing the pressure in a tube facing the direction of travel of the aircraft to the static air pressure. Speaking generally, airspeed probe-type systems do not sense airspeed accurately at low airspeeds due to large rotor downwash, high angles of attack and slide slip, and poor signal to noise ratio in dimensionally low values of pressure measurement occurring at low airspeeds.

SUMMARY

In an aircraft as described above, without information concerning low airspeed, control settings may not be readily adjusted to react to changes in airspeed efficiently. Consequently, an aircraft may be limited to operating at a single setpoint at speeds below a point at which air probe data alone is reliable. This may result in degraded handling qualities, performance, stability, and efficiency, for example.

The present disclosure describes methods, apparatuses, and non-transitory computer-readable media relating to measurement of airspeed, including low airspeed, for aircraft.

In an exemplary aspect, a method for controlling a rotary wing aircraft. The method includes determining a measured airspeed of the rotary wing aircraft based on data from a pitot probe, determining an estimated airspeed of the rotary wing aircraft based on rotor control commands, and determining a blended airspeed based on both the measured airspeed and the estimated airspeed.

In a further exemplary aspect, a method for controlling a rotary wing aircraft is provided. The method includes receiving information relating to a measured airspeed of the rotary wing aircraft and an estimated airspeed of the rotary wing aircraft, assigning a first fade value to the measured airspeed, the first fade value corresponding to a confidence level associated with the measured airspeed, and assigning a second fade value to the estimated airspeed, the second fade value corresponds to a confidence level associated with the estimated airspeed. The method further includes calculating a faded measured airspeed based on at least the measured airspeed and the first fade value, calculating a faded estimated airspeed based on at least the estimated airspeed and the second fade value, and calculating a blended airspeed based on both of the faded measured airspeed and the faded estimated airspeed.

In yet a further exemplary aspect, a rotary wing aircraft is provided. The rotary wing aircraft includes a flight control computer, an actuator communicably coupled to the flight control computer a probe communicably coupled to the flight control computer and configured to provide probe data to the flight control computer, and one or more cockpit controls. The flight control computer is configured to receive the probe data from the probe, receive control inputs from the one or more cockpit controls and determine commanded actuator positions, calculate a measured airspeed based on the probe data, calculate an estimated airspeed based on the commanded actuator positions, determine a first fade value based on the measured airspeed, determine a second fade value based on the estimated airspeed, determine a blended airspeed based on the measured airspeed, the estimated airspeed, the first fade value, and the second fade value, and control the rotary wing aircraft based at least in part on the blended airspeed.

In yet a further exemplary aspect, a flight control computer for controlling one or more components for a rotary wing aircraft is provided. The flight control computer includes one or more processors communicated with a one or more non-transitory computer-readable media configured to store fade value data, the one or more non-transitory computer-readable media storing instructions that, when executed by the one or more processors, cause the one or more processors to perform operations. The operations include determining a measured airspeed based on at least pitot probe data, determining an estimated airspeed based on at least swashplate position sensor data, determining a first fade value associated with the measured airspeed based at least in part on the fade value data stored in the one or more non-transitory computer-readable media, determining a second fade value associated with the estimated airspeed based at least in part on the fade value data stored in the one or more non-transitory computer-readable media, calculating a blended airspeed based on the measured airspeed, the first fade value, the estimated airspeed, and the second fade value, and controlling the rotary wing aircraft based on the blended airspeed.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

It will be recognized that the Figures are the schematic representations for purposes of illustration. The Figures are provided for the purpose of illustrating one or more implementations with the explicit understanding that the Figures will not be used to limit the scope of the meaning of the claims.

DETAILED DESCRIPTION

Following below are more detailed descriptions of various concepts related to, and implementations of, methods and apparatuses for providing airspeed data for rotary-wing aircraft at low airspeeds. The various concepts introduced above and discussed in greater detail below may be implemented in any of a number of ways, as the described concepts are not limited to any particular manner of implementation. Examples of specific implementations and applications are provided primarily for illustrative purposes.

Referring to the figures generally, various embodiments disclosed herein relate to providing airspeed data for rotary-wing aircraft at low airspeeds. As explained in more detail herein, the methods include blending data from airspeed probe data with readily available aircraft state information to create a single airspeed data source. The airspeed data can be used to adjust the control settings of the aircraft to provide improved performance, stability, and efficiency. The airspeed data can further be used for health and usage monitoring of aircraft components. Prior methods of generating airspeed data at low airspeeds have included the use of aircraft state information (cyclic and collective control stick positions, pitch and roll attitudes, swashplate angle, rotor speed etc.) or additional sensors, such as optical or laser-based sensors. However, methods using only aircraft state information are not robust in a large range of speeds and configurations, and additional sensors add complexity and weight, have problems with reliability, and complicate control law voter algorithms. The methods described herein rely on existing airspeed probe data in addition to aircraft state data in a manner that reduces the number of additional sensors used. In particular, in some embodiments, airspeed is detected based on use of the airspeed probe data and aircraft state data without additional sensors.

Figure 1:
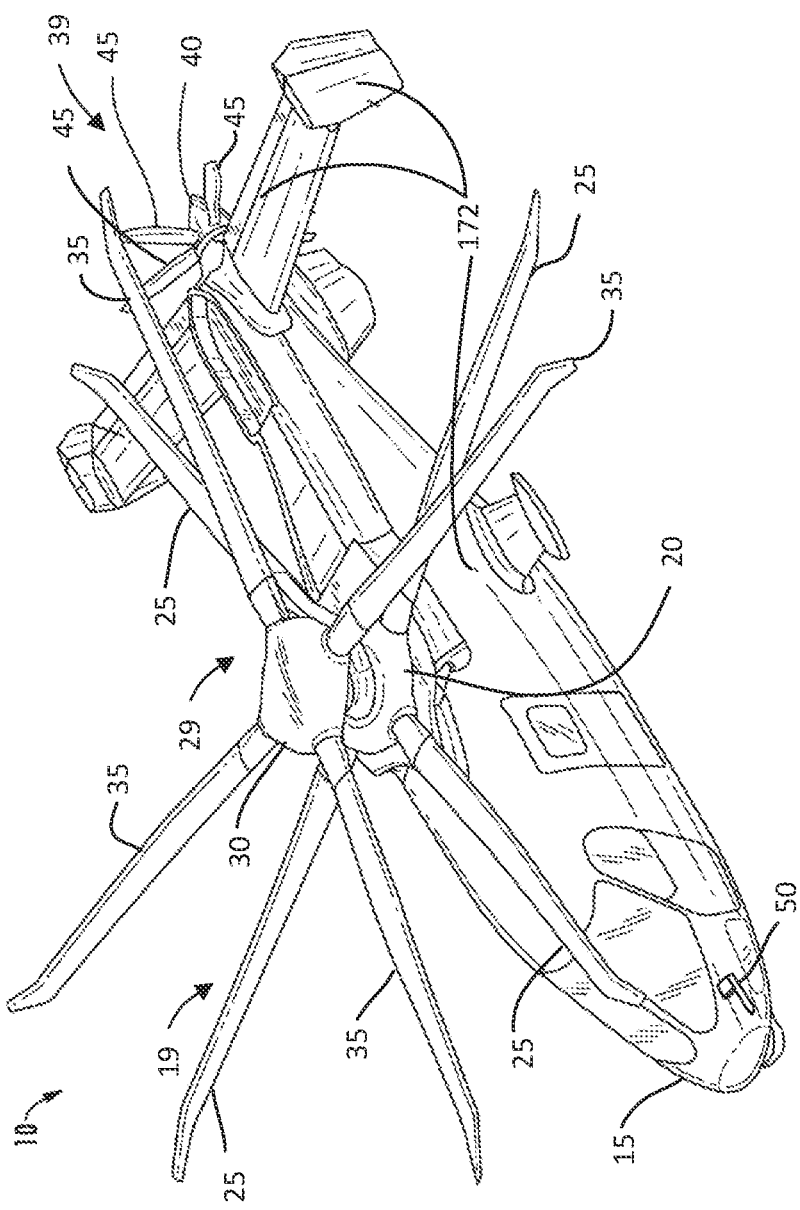
FIG. 1 is perspective view of a rotary wing aircraft in accordance with an exemplary embodiment.

FIG. 1 is perspective view of a rotary wing aircraft 10 in accordance with an exemplary embodiment. The rotary wing aircraft 10 includes a body 15, a lower rotor 19 including a lower rotor hub 20 that drives four lower rotor blades 25, an upper rotor 29 including an upper rotor hub 30 that drives four upper rotor blades 35, a propulsor 39 including a propulsor hub 40 that drives a plurality of propulsor blades 45, and at least one airspeed probe 50. The airspeed probe 50 may be, for example, a pitot probe. In various embodiments, rotary wing aircraft 10 may have a different number of rotor hubs, rotor blades, propulsor hubs and propulsor blades. In various embodiments, the rotary wing aircraft 10 may have one or more tail rotors rather than a propulsor 39. The aircraft 10 includes a plurality of actuators 172 that may be adjusted by one or more flight control computers (flight controllers) based on the flight regime, airspeed, and/or operator inputs.

In the rotary wing aircraft 10 shown in FIG. 1, the upper and lower rotor hubs 20, 30 rotate about a vertical axis (relative to the aircraft) to spin the rotor blades, 25, 35 to generate lift. The rotor hubs may include swashplates or other control mechanisms configured to adjust the pitch angle of the blades 25, 35 in response to an input from a pilot using a collective control, a cyclic stick, and/or yaw pedals. The pitch adjustments may change the amount of lift generated by the blades 25, 35, and may cause the blades 25, 35 to generate thrust in a chosen direction. The propulsor hub 40 may rotate about a horizontal axis running from the nose to the tail of the rotary wing aircraft 10 to spin the propulsor blades 45 to generate moment or thrust. The propulsor hub 40 may include a swashplate or other control mechanism similar to the rotor hubs 20, 30 to adjust the pitch of the propulsor blades 45. The airspeed probe 50 may be positioned facing the front of the aircraft 10 and can measure the difference between the air pressure generated by air entering the tube during flight and the static air pressure.

Modern aircraft typically include fly-by-wire controls rather than manual cockpit controls alone. In a fly-by-wire system, movements of cockpit controls by an operator, such as the collective control, the cyclic stick, and the yaw pedals, are converted to electronic signals transmitted electronically to a flight control computer. The flight control computer determines how to adjust various actuators that control the swashplate or a control surface to provide a response to a command from the operator. Rather than directly converting the control inputs into actuator outputs, the fly-by-wire system uses control algorithms to adjust the actuator outputs based on various information, including flight speed. For example, in response to an identical collective control input, the control algorithms may adjust the actuators differently depending on whether the helicopter is traveling at 20 knots or 60 knots. These systems greatly reduce operator workload and enhance safety. The control systems rely on accurate airspeed measurements to control the actuators to produce the correct aircraft response. However, as discussed above, measuring airspeed at low airspeeds is difficult, and existing techniques may be inefficient or have other deficiencies. Because of the lack of airspeed data, the control algorithm cannot readily adjust to provide desired control. Instead, a single control algorithm is used at all airspeeds below a certain threshold. "Low airspeed" may be defined as an airspeed lower than a threshold airspeed, where airspeeds below the threshold airspeed are associated with unreliable air probe data. In some embodiments, "low airspeed" includes reverse flight (e.g., negative airspeed).

In some embodiments, for example, low airspeed may be an airspeed below approximately 40 knots, e.g., an airspeed that is (i) greater than 0 knots and (ii) less than approximately 40 knots, less than approximately 35 knots, less than approximately 30 knots, less than approximately 25 knots, less than approximately 20 knots, less than approximately 15 knots, less than approximately 10 knots, less than approximately 5 knots, less than approximately 2.5 knots, or less than 1 knot. The foregoing are purely illustrative examples of low airspeeds and are not limiting. In some embodiments, a control algorithm may be used when there are one or more other indicia that the air probe data may be unreliable, including but not limited to an error rate exceeding a threshold error rate for sensing of a sensed parameter (e.g., rotor wash). In some embodiments, the control algorithm may be employed when a sensor resolution exceeds a predetermined resolution.

Figure 2:
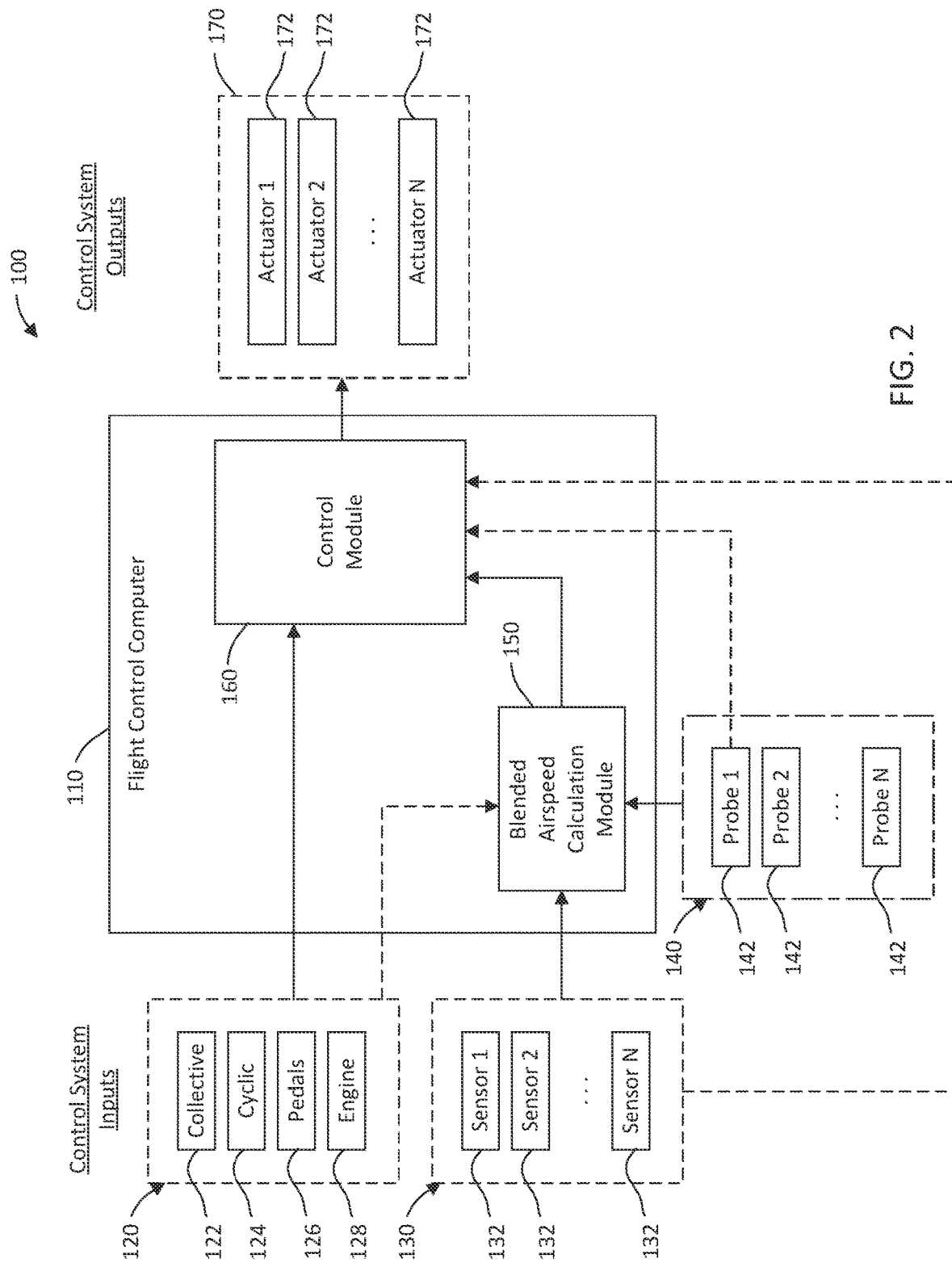
FIG. 2 is a schematic block diagram of a flight control system according to an exemplary embodiment.

FIG. 2 illustrates a schematic block diagram of a flight control system 100 according to an exemplary embodiment. The system 100 includes a flight control computer 110 configured to calculate actuator outputs based on various control and sensor inputs. For example, the flight control computer 110 may receive inputs from the cockpit controls 120, the sensor array 130, and to the probe array 140. The cockpit controls 120 may include a collective control 122, a cyclic stick 124, one or more yaw pedals 126, and an engine control 128. The cockpit controls 120 may send signals to the control module 160, which determines the actuator positions necessary to execute the inputs from the cockpit controls 120 and commands the actuators to move to the determined positions. The actuator positions determined by the control module 160 may be referred to as commanded actuator positions.

The sensor array 130 may include one or more sensors 132. The plurality of sensors may include, but are not limited to, rotor position sensors, swashplate position sensors, pitch rate sensors, roll rate sensors, yaw rate sensors, engine torque meters, and rotor speed tachometers, or any combination thereof. The probe array 140 may include one or more airspeed probes 142, such as pitot probes. The flight control computer 110 may include one or more processors and one or more non-transitory computer-readable media configured to store instructions that, when executed by the one or more processors, cause the one or more processors to perform the calculations and methods described herein.

The flight control computer 110 is configured to include a blended airspeed calculation module (calculator or calculation circuitry) 150 configured to calculate the airspeed of the rotary wing aircraft 10 at low airspeeds and a control module 160 configured to control the flight of the aircraft 10, including the swashplate actuators and other control surface actuators. In some embodiments, the blended airspeed calculation module 150 is configured to communicate with at least one of the sensor(s) 132 or the probe(s) 142. In some embodiments, the commanded actuator positions sent from the control module 160 to the actuators are sent to the blended airspeed calculation module 150. In some embodiments, measurements from the sensors 132 and the probes 142 are received by the blended airspeed calculation module 150. The blended airspeed calculation module 150 may calculate the airspeed of the rotary wing aircraft 10 based on the sensor measurements, probe measurements, and/or commanded actuator positions. In some embodiments, the inputs from the flight controls 120 may also be used to calculate the airspeed. For example, the inputs from the flight controls 120 may provide an independent basis to infer airspeed. More particularly, in certain embodiments such as mechanical aircraft, the inputs from flight controls 120 may be used to calculate airspeed, such as mechanical control positions 120 being used to determine the position of the rotor cyclic to provide an independent basis to infer airspeed. For example, in some embodiments, swashplate position sensor measurements and other sensor measurements may be used to calculate the airspeed, while in other embodiments, the commanded swashplate actuator positions may be used to calculate airspeed directly without separately sensing the swashplate positions. In some embodiments, a combination of sensor measurements and commanded actuator positions may be used to calculate airspeed.

In some embodiments, the control module 160 receives the calculated airspeed from the blended airspeed calculation module 150 and the inputs from the cockpit controls 120. The control module 160 applies a flight control algorithm using the calculated airspeed and the cockpit control inputs to calculate the control system outputs 170. The control system outputs 170 may include instructions to adjust the position of one or more of the actuators 172. For example, the flight control computer 110 may send electrical signals (e.g., control position signals) to the actuators 172 instructing and causing the actuators 172 to adjust their positions. In some embodiments, the control system outputs 170 may include instructions to adjust the rotational rotor speed, the rotational tail rotor or propulsor speed, the position of tail rotor or propulsor actuators, or any other feature of the aircraft 10 controllable by the flight control computer 110.

In some embodiments, a measured airspeed may be determined based on the probe 142 measurements and an estimated airspeed may be determined based on sensor 132 measurements. For example, the estimated airspeed may be determined based on data from one or more swashplate position sensors 132, and the measured airspeed may be determined based on data from one or more pitot probes 142. In some embodiments, the measured airspeed may be determined based on the probe 142 measurements and the estimated airspeed may be based on commanded actuator positions from the control module 160. The measured airspeed and the estimated airspeed may then be blended to determine a blended airspeed. Depending on the determined measured and estimated airspeeds, a different weight may be given to each of the measured airspeed and estimated airspeed in determining the blended airspeed. At low airspeeds, the blended airspeed may provide a more accurate calculation of airspeed than the measured airspeed or estimated airspeed alone.

Figure 3:
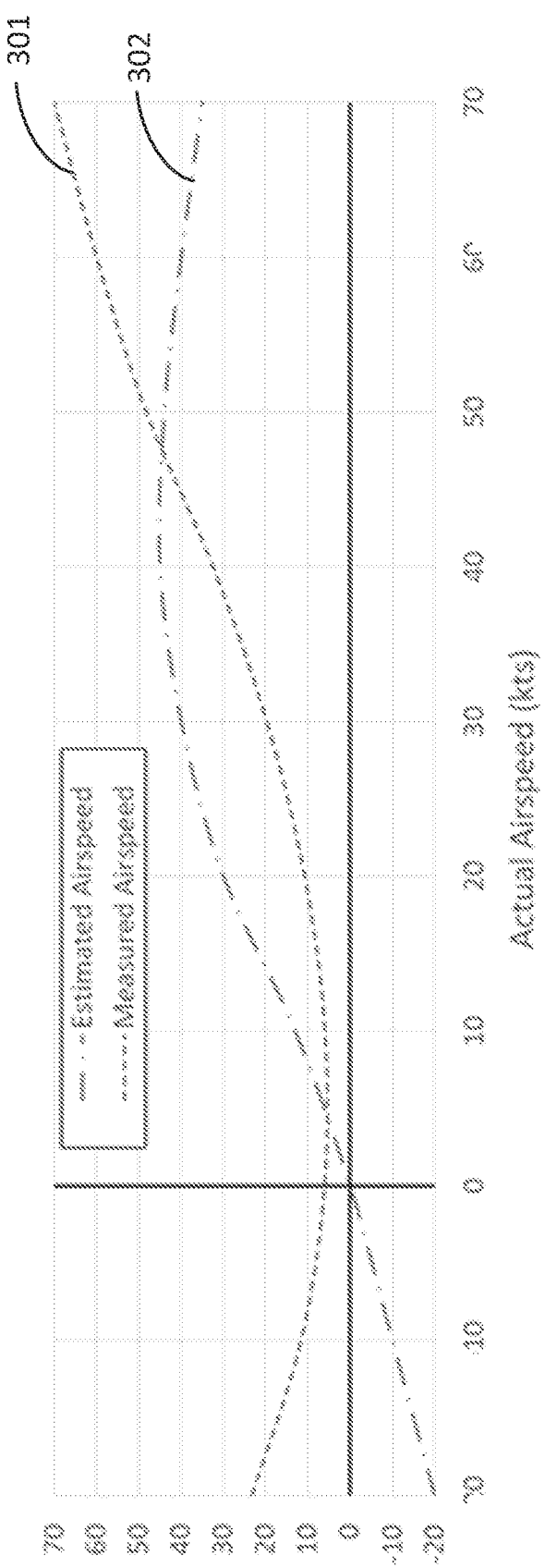
FIG. 3 is a graph of experimental data illustrating the airspeeds predicted by the measured airspeed and estimated airspeed compared to the actual airspeed.

FIG. 3 is a graph of experimental data illustrating the airspeeds predicted by the measured airspeed 301 and estimated airspeed 302 compared to the actual airspeed. On this graph, a theoretically perfect measurement of airspeed would appear as a straight line, with the x value equal to the y value, indicating that the measurement predicted is exactly equal to the actual airspeed. As can be seen in FIG. 3, neither the measured airspeed 301 nor the estimated airspeed 302 perfectly predict the actual airspeed. However, the estimated airspeed 302 provides a relatively good prediction of actual airspeed from −20 knots to about 35 knots, and then becomes less accurate as the airspeed increases. Conversely, the measured airspeed 301 provides a relatively poor prediction of actual airspeed in the negative direction (e.g., in a reverse air direction) and below about 25 knots, and becomes more accurate as the airspeed increases. According to some embodiments, the measured airspeed 301 and the estimated airspeed 302 may each be assigned a fade value to determine a faded measured airspeed and a faded estimated airspeed respectively. The faded airspeeds may then be blended to determine a blended airspeed that is more accurate (e.g., more closely predictive of the actual airspeed) than the measured airspeed 301 or the estimated airspeed 302. For example, at low airspeeds, estimated airspeed 302 may be assigned a higher fade value than measured airspeed 301. At higher airspeeds, measured airspeed 301 may be assigned a higher fade value than estimated airspeed 302. When calculating the blended airspeed, the airspeed with the higher fade value may have a larger effect on the calculation of the blended airspeed than the airspeed with the lower fade value.

Figure 4:
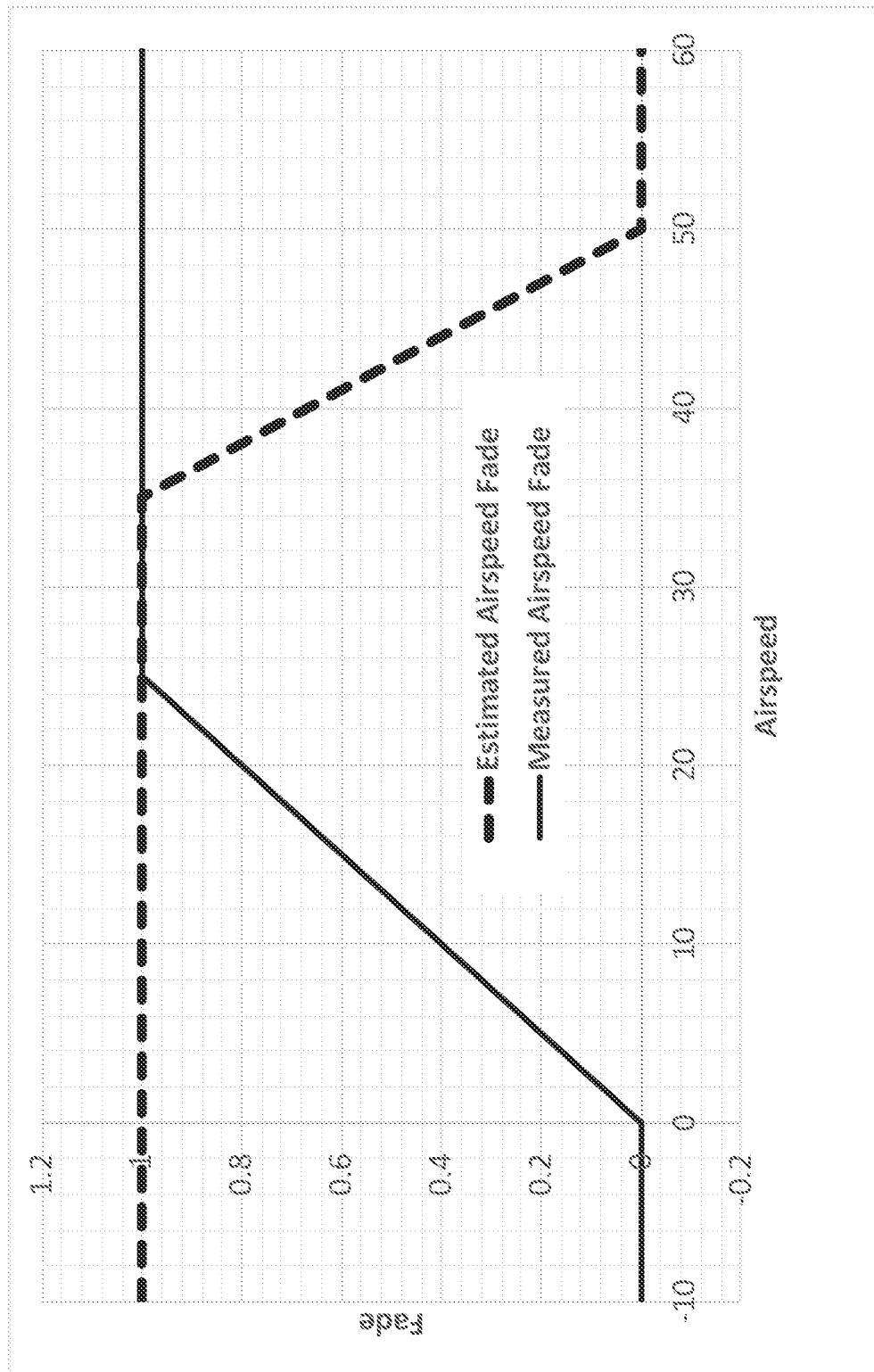
FIG. 4 is a graph representing the fade values assigned to the estimated airspeed and the measured airspeed, according to an exemplary embodiment.

FIG. 4 is a graph representing the fade values assigned to the estimated airspeed and the measured airspeed, according to an embodiment. In this embodiment, the measured airspeed and the estimated airspeed are given different fade values depending on their values. A higher fade value indicates that the estimated or measured airspeed should be given more weight in calculating the blended airspeed. The fade values may vary from a minimum of zero to a maximum of one. In some embodiments, an estimated or measured airspeed with a fade value of zero is not used to calculate the blended airspeed. In some embodiments, when the measured airspeed and the estimated airspeed have the same fade values, the measured airspeed and estimated airspeed may be weighted equally when calculating the blended airspeed. It should be understood that the numerical values shown are for example purposes only. Alternative weighting curves and calculation methods are contemplated according to various embodiments within the scope of the present disclosure.

Fade values may correspond to the relative confidence in the accuracy of the estimated and measured airspeeds. A higher fade value indicates that the estimated or measured airspeed is relatively likely to be correct or nearly correct. For example, at a fade value of about 1.0 the measured or estimated airspeed is relatively highly likely to be accurate, within an acceptable tolerance. At a fade value of zero, the measured or estimated airspeed is not relatively likely to be correct or nearly correct. As shown in FIG. 3, the measured airspeed is a relatively accurate measurement of the actual airspeed at higher airspeeds. Thus, the confidence in the accuracy of the measured airspeed is relatively high at higher airspeeds. Because the relative confidence in the accuracy of the measured airspeed is high at higher airspeeds, the measured airspeed fade value may increase as the measured airspeed increases, as shown in FIG. 4. Conversely, as shown in FIG. 3, the estimated airspeed is a relatively accurate measurement of the actual airspeed at lower airspeeds. Thus, the confidence in the accuracy of the estimated airspeed is relatively high at lower airspeeds. Because the relative confidence in the accuracy of the estimated airspeed is high at lower airspeeds, the estimated airspeed fade value may increase as the estimated airspeed decreases. Using the fade values, the blended airspeed calculation module 150 is configured to give more weight to the estimated airspeed than to the measured airspeed at lower airspeeds when calculating the blended airspeed because the relative confidence in the estimated airspeed is higher than the relative confidence in the measured airspeed. The blended airspeed calculation module 150 is also configured to give more weight to the measured airspeed than to the estimated airspeed at higher airspeeds when calculating the blended airspeed because the relative confidence in the measured airspeed is higher than the relative confidence in the estimated airspeed.

In some embodiments, the airspeeds may be defined using ranges. For example, the airspeeds may be defined as having an upper airspeed range and a lower airspeed range. The upper airspeed range may be the range at which the measured airspeed fade value is at a maximum (e.g., above 25 knots as shown in FIG. 4). The lower airspeed range may be the range at which the estimated airspeed fade value is at a maximum (e.g., below 35 knots as shown in FIG. 4). In these embodiments, the upper airspeed range and lower airspeed range may overlap (e.g., from 25 knots to 35 knots as shown in FIG. 4). In some embodiments, the airspeeds may be described as having a middle airspeed range. For example, the middle airspeed range may be the range at which the measured airspeed fade value and the estimated airspeed fade value are both at a maximum (e.g., from 25 knots to 35 knots as shown in FIG. 4). When the airspeed has a middle range, the upper airspeed range may include airspeeds above the middle range and the lower airspeed range may include airspeeds below the middle airspeed range. In various embodiments, the airspeed ranges may be referred to as first, second, and third airspeed ranges rather than lower, upper, or middle airspeed ranges. In some embodiments, the airspeed may have transition airspeed ranges. For example, the airspeed may be described as having a lower transition airspeed range (e.g., a first transition airspeed range), in which the measured airspeed fade value increases as airspeed increases. For example, the measured airspeed fade value may transition from a minimum to a maximum as airspeed increases in the first transition airspeed range (e.g., from 0 knots to 25 knots as shown in FIG. 4). The airspeed may have an upper transition airspeed range (e.g., a second transition airspeed range), in which the estimated airspeed fade value decreases as airspeed increases. For example, the estimated airspeed fade value may transition from a maximum to a minimum as airspeed increases in the second transition airspeed range (e.g., from 35 knots to 50 knots).

Figure 5:
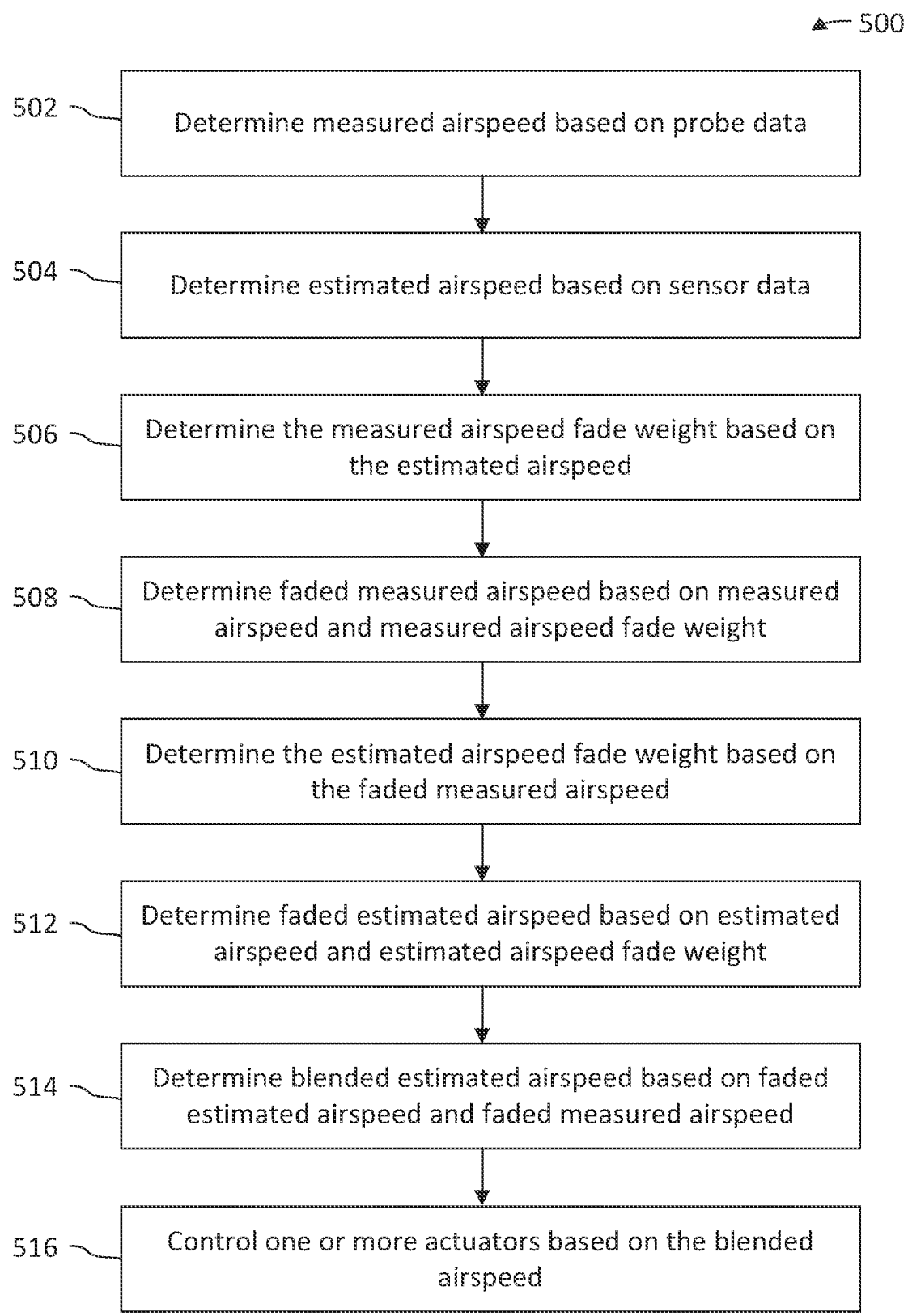
FIG. 5 illustrates a process (e.g., a method) for calculating blended airspeed and controlling one or more actuators based on the calculated blended airspeed.

FIG. 5 illustrates a process 500 (e.g., a method) for calculating blended airspeed and controlling one or more actuators based on the calculated blended airspeed. It should be appreciated that the process steps shown and described in connection with any depicted flow diagram are exemplary in nature. The order of steps may be varied from what is shown, and/or particular steps may be omitted, and/or additional steps may be added. As compared to what is depicted, various embodiments may include additional steps (e.g., prior to an initial depicted step, in between steps, or following a final depicted step). The method may be performed by flight control computer 110.

In at least one embodiment, the process 500 begins at operation 502. At operation 502, the measured airspeed is determined based on probe data. The probe data may include, for example, measurements from one or more pitot probes.

At operation 504, the estimated airspeed is determined based on commanded actuator positions from the control module 160. For example, the control module may command the swashplate actuators and/or control surface actuators to extend or retract to a specific position based on the commands from the cockpit controls 120 to control the flight of the aircraft 10. The airspeed of a rotary wing aircraft generally increases as the swashplate angle in the forward direction increases (e.g., as the forward tilt of the swashplate increases). When an operator pushes forward on the cyclic stick 124, the control module 160 commands the swashplate actuators to tilt the swashplate forward to increase the forward speed of the aircraft 10. The commanded actuator positions from the control module are sent to the blended airspeed calculation module 150, which may determine that the estimated airspeed has increased based on the commanded actuator positions. Similarly, the blended airspeed calculation module 150 may determine that the estimated airspeed decreases (e.g., to zero) when the cyclic stick 124 is in a neutral position and the swashplate is commanded to be in a neutral position. When the cyclic stick is pulled black, the control module 160 commands the swashplate actuators to tilt the swashplate in the rearward direction, and the blended airspeed calculation module 150 may determine that the estimated airspeed is negative (e.g., the aircraft is being flown in a negative airspeed or reverse direction). In some embodiments, sensor data from various sensors 132 and/or inputs from the cockpit controls 120 may be used instead of or in addition to the commanded actuator positions to determine the estimated airspeed.

At operation 506, the measured airspeed fade value (e.g., a first fade value) is determined based on the estimated airspeed. For example, the measured airspeed fade value may be determined by a fade value curve as shown in FIG. 4 or a fade value table that correlates each measured airspeed with a fade value. Using the fade value curve in FIG. 4, the estimated air speed is correlated to a measured airspeed fade value. For example, if the estimated airspeed is 10, the measured airspeed fade value is 0.4. The measured fade value corresponds to a confidence level associated with the measured airspeed.

At operation 508, the faded measured airspeed is calculated based on the measured airspeed fade value. In some embodiments, the faded measured airspeed also depends on the estimated airspeed. As a non-limiting example, the faded measured airspeed may be calculated according to the following equation:

$$\text{Airspeed}_{fm} = [(\text{Airspeed}_m - \text{Airspeed}_e) * \text{Fade}_{ma}] + \text{Airspeed}_e, \quad \text{(Equation 1)}$$

where $\text{Airspeed}_{fm}$ is the faded measured airspeed, $\text{Airspeed}_m$ is the measured airspeed, $\text{Airspeed}_e$ is the estimated airspeed, and $\text{Fade}_{ma}$ is the measured airspeed fade.

At operation 510, the estimated airspeed fade value (e.g., a second fade value) is determined based on the faded measured airspeed. For example, the estimated airspeed fade value may be determined by a fade value curve as shown in FIG. 4 or a fade value table that correlates each estimated airspeed with a fade value. Using the fade value curve in FIG. 4, the faded measured airspeed is correlated to an estimated airspeed fade value. For example, if the faded measured airspeed is 10, the estimated airspeed fade value is 1.0. The estimated fade value corresponds to a confidence level associated with the estimated airspeed.

At operation 512, the faded estimated airspeed is calculated based on the estimated airspeed fade value. In some embodiments, the faded estimated airspeed also depends on the faded measured airspeed. As a non-limiting example, the faded estimated airspeed may be calculated according to the following formula:

$$\text{Airspeed}_{fe} = [(\text{Airspeed}_e - \text{Airspeed}_m) * \text{Fade}_{ea}] + \text{Airspeed}_m, \quad \text{(Equation 2)}$$

where $\text{Airspeed}_{fe}$ is the faded estimated airspeed, $\text{Airspeed}_e$ is the estimated airspeed, $\text{Airspeed}_m$ is the measured airspeed, and $\text{Fade}_{ea}$ is the estimated airspeed fade value.

At operation 514, the blended airspeed is calculated based on the faded estimated airspeed and the faded measured airspeed. As a non-limiting example, the faded estimated airspeed may be calculated according to the following formula:

$$\text{Airspeed}_b = (\text{Airspeed}_{fm} + \text{Airspeed}_{fe})/2, \quad \text{(Equation 3)}$$

where $\text{Airspeed}_b$ is the blended airspeed, $\text{Airspeed}_{fm}$ is the faded measured airspeed, and $\text{Airspeed}_{fe}$ is the faded estimated airspeed.

At operation 516, the aircraft 10 may be controlled based on the blended airspeed. The blended airspeed may be used as an input to schedule control gains or to adjust or change one or more control modes. The control may be adjusted based on at least one of a control schedule (or control schedules) and/or a control mode (or control modes). For example, the stability incidence angle can be controlled based in part on the blended airspeed. The blended airspeed may be used as an input to a lookup table that outputs a gain value and/or used in mixing equations to determine how the aircraft is controlled. Rotor controls change as a function of airspeed due to forces and moments changing with airspeed. Forces and moments have to be balanced to achieve a level flight trim. The blended airspeed may be used as an input to determine how actuators (e.g., swashplate actuators, control surface actuators, etc.) should be positioned. In some embodiments, certain control devices (e.g., yaw control devices) may be enabled or disabled based on the blended airspeed.

As a first example of process 500, the measured airspeed may be determined at process 502 to be 30 knots and the estimated airspeed may be determined at operation 504 to be 50 knots. Referring in this example to the fade value graph of FIG. 4 it is determined at operation 506 that a first estimated airspeed (e.g., around 50 knots) corresponds to a measured airspeed fade value of about 1.0. At operation 508, the faded measured airspeed may be calculated using Equation 1:

$$\text{Airspeed}_{fm} = [(\text{Airspeed}_m - \text{Airspeed}_e) * \text{Fade}_{ma}] + \text{Airspeed}_e.$$

For example, $\text{Airspeed}_{fm} = [(30 \text{ knots} - 50 \text{ knots}) * 1.0] + 50 \text{ knots} = 30 \text{ knots}$.

At operation 510, it is determined the measured airspeed (e.g., 30 knots) corresponds to an estimated airspeed fade value of about 1.0. In some embodiments, the discrete values in FIG. 4 may be populated into a look-up table, which is consulted by the blended airspeed calculation module 150 in implementing process 500. At operation 512, the faded estimated airspeed may be calculated using Equation 2 above:

$$\text{Airspeed}_{fe} = [(\text{Airspeed}_e - \text{Airspeed}_m) * \text{Fade}_{ea}] + \text{Airspeed}_m.$$

Following the example above, $\text{Airspeed}_{fe} = [(50 \text{ knots} - 30 \text{ knots}) * 0.0] + 30 \text{ knots} = 30 \text{ knots}$.

At operation 514, the blended estimated airspeed may be calculated using Equation 3:

$$\text{Airspeed}_b = (\text{Airspeed}_{fm} + \text{Airspeed}_{fe})/2$$

For example, $\text{Airspeed}_b = (30 \text{ knots} + 30 \text{ knots})/2 = 30 \text{ knots}$.

As a second example of operation 500, the measured airspeed may be determined at process 502 to be 35 knots and the estimated airspeed may be determined at operation 504 to be 45 knots. Referring, in this example, to the fade value graph of FIG. 4, it is determined at operation 506 that a 45 knot estimated airspeed corresponds to a measured airspeed fade value of 1.0. At operation 508, the faded measured airspeed may be calculated using Equation 1:

$$\text{Airspeed}_{fm} = [(35 \text{ knots} - 45 \text{ knots}) * 1.0] + 45 \text{ knots} = 35 \text{ knots}.$$

At operation 510, it is determined the measured airspeed (e.g., 35 knots) corresponds to an estimated airspeed fade value of 1.0.

At operation 512, the faded estimated airspeed may be calculated using Equation 2:

$$\text{Airspeed}_{fe} = [45 \text{ knots} - 35 \text{ knots}) * 1.0] + 35 \text{ knots} = 45 \text{ knots}.$$

At operation 514, the blended estimated airspeed may be calculated using Equation 3:

$$\text{Airspeed}_b = (35 \text{ knots} + 45 \text{ knots})/2 = 40 \text{ knots}.$$

As a third example of process 500, the measured airspeed may be determined at process 502 to be 20 knots and the estimated airspeed may be determined at process 504 to be 10 knots. Referring, in this example, to the fade value graph of FIG. 3, it is determined at operation 506 that a 10 knot estimated airspeed corresponds to a measured airspeed fade value of 0.4. At operation 508, the faded measured airspeed may be calculated using Equation 1:

$$\text{Airspeed}_{fm} = (20 \text{ knots} - 10 \text{ knots}) * 0.4 + 10 \text{ knots} = 14 \text{ knots}.$$

At operation 510, it is determined the faded measured airspeed (e.g., 20 knots) corresponds to an estimated airspeed fade value of 1.0.

At operation 512, the faded estimated airspeed may be calculated using Equation 2:

$$\text{Airspeed}_{fe} = (10 \text{ knots} - 20 \text{ knots}) * 1.0 + 20 \text{ knots} = 10 \text{ knots}.$$

At operation 514, the blended estimated airspeed may be calculated using Equation 3:

$$\text{Airspeed}_b = (14 \text{ knots} + 10 \text{ knots})/2 = 12 \text{ knots}.$$

As a fourth example of process 500, the measured airspeed may be determined at process 502 to be 44 knots and the estimated airspeed may be determined at process 504 to be 30 knots. Referring, in this example, to the fade value graph of FIG. 3, it is determined at operation 506 that a 30 knot estimated airspeed corresponds to a measured airspeed fade value of 1.0. At operation 508, the faded estimated airspeed may be calculated using Equation 1:

$$\text{Airspeed}_{fm} = (44 \text{ knots} - 30 \text{ knots}) * 1.0 + 30 \text{ knots} = 44 \text{ knots}.$$

At operation 510, it is determined that the faded measured airspeed (e.g., 44 knots) corresponds to an estimated airspeed fade value of 1.0.

At operation 512, the faded estimated airspeed may be calculated using the formula above:

$$\text{Airspeed}_{fe} = (30 \text{ knots} - 44 \text{ knots}) * 0.4 + 30 \text{ knots} = 38.4 \text{ knots}.$$

At operation 514, the blended estimated airspeed may be calculated using the formula above:

$$\text{Airspeed}_b = (44 \text{ knots} + 38.6 \text{ knots})/2 = 41.2 \text{ knots}.$$

As seen from these examples, using the exemplary Equations (1)-(3), when one of the measured or estimated airspeed has a fade value of 1.0 and the other has a fade value of 0.0 (e.g., in the first example), the resulting blended airspeed is equal to the airspeed with a fade value of 1.0. The airspeed with a fade value of 0.0 does not affect the calculation of the blended airspeed. When the measured airspeed fade value is equal to the estimated airspeed fade value (e.g., in the second example), the resulting blended airspeed is an arithmetic average of the measured airspeed and the estimated airspeed. Here, the measured airspeed and estimated airspeed are weighted equally due to their equal fade values. As can be seen in the third and fourth examples, when one fade value is higher than the other, the blended airspeed will be closer to the airspeed with the higher fade value. When the estimated airspeed fade value is greater than the estimated airspeed fade value (e.g., in the third example), the resulting blended airspeed is closer to the estimated airspeed than to the measured airspeed. When the measured airspeed fade value is higher than the estimated airspeed fade value (e.g., in the fourth example), the resulting blended airspeed is closer to the measured airspeed than to the estimated airspeed. Thus, more weight is given to the airspeed with the higher fade value when calculating the blended airspeed.

Figure 6:
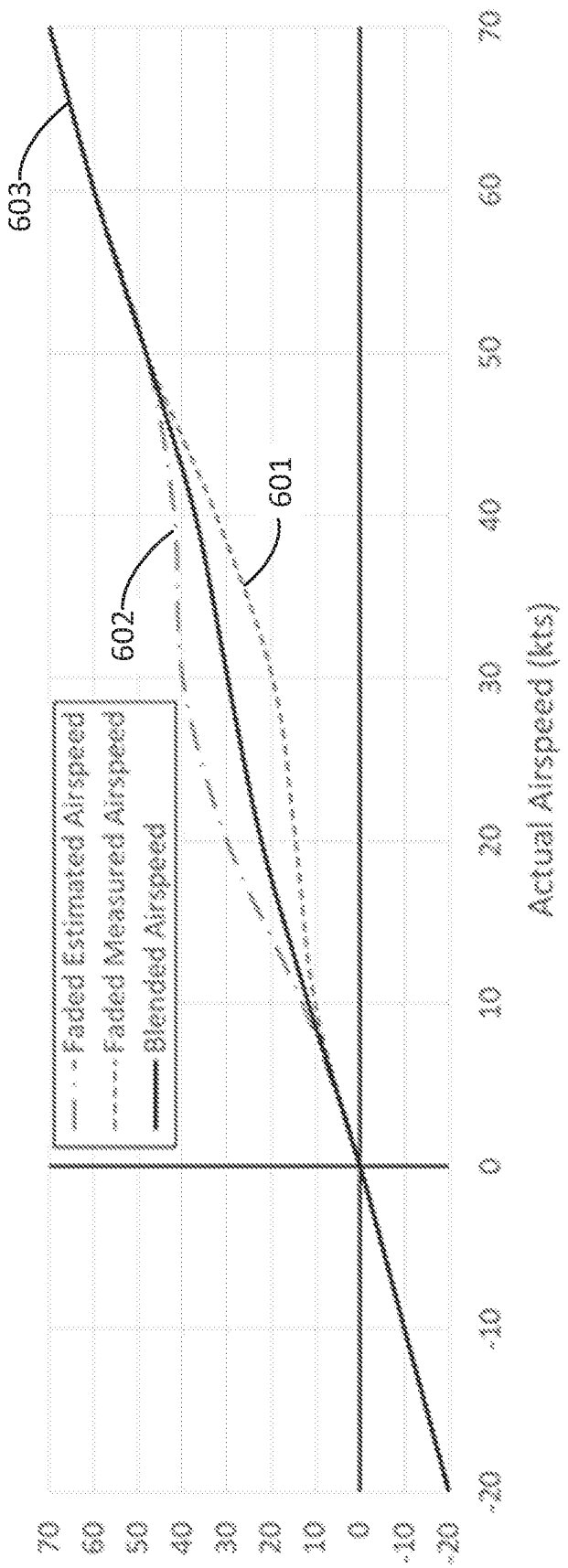
FIG. 6 is a graph of experimental data comparing the faded measured airspeed, the faded estimated airspeed, and the blended airspeed to the actual airspeed, according to an exemplary embodiment.

FIG. 6 is a graph of experimental data, according to an exemplary embodiment, comparing the faded measured airspeed 601, the faded estimated airspeed 602, and the blended airspeed 603 to the actual airspeed based on the measured airspeed 301 and the estimated airspeed 302 shown in FIG. 3. The faded measured airspeed 601, the faded estimated airspeed 602, and the blended airspeed 603 may be determined based on the methods described above. As explained above, in negative airspeeds and low positive airspeeds, the estimated airspeed 302 is more accurate than the measured airspeed 301, and therefore receives a higher fade value. At these low airspeeds, the blended airspeed 603 may be similar to the estimated airspeed 302 as shown in FIG. 3 (e.g., within a predetermined threshold, which may be ±about 5%, ±about 10%, or ±about 15%, for example). In some embodiments, at low airspeeds, the blended airspeed 603 may be the same as the estimated airspeed 302, for example if the fade value of the measured airspeed 301 is zero.

As the airspeeds approach 25 knots, the fade value of the measured airspeed 301 may increase and the blended airspeed 603 may be increasingly affected by the measured airspeed 301. From about 25 knots to about 35 knots, the measured airspeed 301 and the estimated airspeed 302 may be roughly equally accurate and may have substantially equal fade values. Thus, the blended airspeed 603 may be between the measured airspeed 301 and the estimated airspeed 302. As can be seen in FIG. 6, from about 20 knots to 40 knots, the faded measured airspeed 601 tends to underestimate the actual airspeed and faded estimated airspeed 602 tends to overestimate the actual airspeed. However, when the faded measured airspeed 601 and the faded estimated airspeed 602 are blended, the blended airspeed 603 is closer to the actual airspeed than the faded measured airspeed 601 and the faded estimated airspeed 602 alone. As the airspeed increases beyond 35 knots, the estimated airspeed 302 becomes less accurate and the measured airspeed 301 becomes more accurate. Accordingly, the fade value of the estimated airspeed 302 decreases and the blended airspeed 603 becomes increasingly similar to the measured airspeed. As shown in FIG. 6, as the airspeed exceeds about 50 knots, the blended airspeed 603 is similar to the measured airspeed 301 shown in FIG. 3 (e.g., within a predetermined threshold as noted above), or may be the same as the measured airspeed 301, for example if the fade value of the estimated airspeed 302 is zero. By blending the measured airspeed 301 and estimated airspeed 302 and using the fade values as described above, the blended airspeed 603 may provide a much closer estimation of actual airspeed.

According to one or more embodiments, the foregoing techniques including a determination of blended airspeed is utilized to carry out control of one or more components of a rotary wing aircraft, although the present techniques are not limited to this type of aircraft. Rotary wing aircraft are typically operated at the same control allocation, command model, gains and mixing throughout the low airspeed region. The embodiments described herein provide a more accurate airspeed estimation that allow the aircraft to adjust the control allocation, command model, gains and mixing within the low airspeed region. Not only can this provide operators with better control of the aircraft, it can provide improved health and usage monitoring for aircraft components. Rotary wing aircraft components are generally scheduled to be replaced based on the amount of time the aircraft spends in various flight regimes, subject to various maintenance and logistics considerations. For example, a given component may have an expected lifetime of about two years if an aircraft is primarily used at low airspeeds and hovering, while the same component may have an expected lifetime that is much shorter if the aircraft is often used at high speeds. With inaccurate low airspeed estimation, a Health and Usage Monitoring System (HUMS) may overestimate the wear on components as a safety factor. For example, if the aircraft is not able to distinguish between airspeeds in the range 20 knots to 40 knots, the HUMS may calculate the wear on various components based on the maximum wear in that range. This may result in the HUMS recommending early replacement of components that still have remaining useful life. Using the embodiments described herein, an aircraft provided with the flight control computer described above is configured to provide the HUMS with accurate airspeed data at low airspeeds, allowing the HUMS to adjust the calculation of the remaining life and replacement date of components accordingly.

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

Unless otherwise indicated, all numbers expressing quantities of properties, parameters, conditions, and so forth, used in the specification and claims are to be understood as being modified in all instances by the term "about." Accordingly, unless indicated to the contrary, the numerical parameters set forth in the following specification and attached claims are approximations. Any numerical parameter should at least be construed in light of the number reported significant digits and by applying ordinary rounding techniques. The term "about" when used before a numerical designation, e.g., speed (velocity), indicates approximations which may vary by (+) or (−) 10%, 5% or 1%.

The present disclosure contemplates methods, systems, and program products on any machine-readable media for accomplishing various operations, e.g., of the flight control computer. The embodiments of the present disclosure may be implemented using existing computer processors, or by a special purpose computer processor for an appropriate system, incorporated for this or another purpose, or by a hardwired system. For example, the abovementioned description, steps, procedures and/or processes including suggested steps can be implemented using hardware, software, firmware (known as a combination of a hardware device and computer instructions and data that reside as read-only software on the hardware device), an optical printer, or a combination thereof. Examples of hardware can include analog, digital, and mixed circuits known as microcircuits, microchips, or silicon chips. Examples of the optical printer may include a system on chip (SoC), system in package (SiP), a computer on module (CoM), and an electrical system.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor (e.g., the flight control computer). By way of example, such machine-readable media can comprise read-only memory (ROM); flash memory; random access memory (RAM); EPROM; EEPROM; hard disk; other optical disk storage, magnetic disk storage, or magnetic storage devices; or any other medium which can be used to carry or store desired program code in the form of machine-executable instructions or data structures and which can be accessed by a general purpose or special purpose computer or other machine with a processor and executed to perform the various operations described herein.

Although the figures or description may indicate a specific order of method steps, the order of the steps may differ from what is depicted. For example, in some embodiments, two or more steps may be performed concurrently or with partial concurrence. Additionally, in some embodiments the above-mentioned steps may be carried out in sequence as shown above or even reversed. All such variations are within the scope of the disclosure. While various aspects and embodiments have been disclosed herein, other aspects and embodiments will be apparent to those skilled in the art. The various aspects and embodiments disclosed herein are for purposes of illustration and are not intended to be limiting, with the scope and spirit of the invention being indicated by the following claims.

What is claimed is:

1. A method for controlling a rotary wing aircraft, the method comprising:
    determining a measured airspeed of the rotary wing aircraft based on data from a pitot probe;
    determining an estimated airspeed of the rotary wing aircraft based on rotor control commands;
    determining a blended airspeed based on both the measured airspeed and the estimated airspeed; and
    controlling one or more actuators of the rotary wing aircraft based on the blended airspeed.

2. The method of claim 1, further comprising controlling the rotary wing aircraft based on the blended airspeed.

3. The method of claim 2, further comprising adjusting at least one of a control schedule or a control mode.

4. A method for controlling a rotary wing aircraft, the method comprising:
    receiving information relating to a measured airspeed of the rotary wing aircraft and an estimated airspeed of the rotary wing aircraft, the information relating to the estimated airspeed comprising commanded actuator positions;
    assigning a first fade value to the measured airspeed, the first fade value corresponding to a confidence level associated with the measured airspeed;
    assigning a second fade value to the estimated airspeed, the second fade value corresponds to a confidence level associated with the estimated airspeed;
    calculating a faded measured airspeed based on at least the measured airspeed and the first fade value;

calculating a faded estimated airspeed based on at least the estimated airspeed and the second fade value;

calculating a blended airspeed based on both of the faded measured airspeed and the faded estimated airspeed; and controlling one or more actuators of the rotary wing aircraft based on the blended airspeed.

5. The method of claim 4, wherein controlling the one or more actuators of the rotary wing aircraft comprises sending an electrical signal instructing the one or more actuators of the rotary wing aircraft to adjust a position of the one or more actuators thereof.

6. The method of claim 4, further comprising:
determining the measured airspeed based on at least pitot probe data; and
determining the estimated airspeed based on at least the commanded actuator positions.

7. The method of claim 4, wherein:
the first fade value is determined based on the estimated airspeed; and
the second fade value is determined based on the measured airspeed.

8. The method of claim 4, wherein:
the blended airspeed is closer to the measured airspeed than the estimated airspeed when the first fade value exceeds the second fade value;
the blended airspeed is closer to the estimated airspeed than the measured airspeed when the second fade value exceeds the first fade value; and
the blended airspeed is an average of the measured airspeed and the estimated airspeed when the first fade value is equal to the second fade value.

9. The method of claim 7, wherein:
the blended airspeed equals the estimated airspeed when the first fade value is zero; and
the blended airspeed equals the measured airspeed when the second fade value is zero.

10. The method of claim 4, further comprising providing the blended airspeed to a health usage and monitoring system of the rotary wing aircraft.

11. A rotary wing aircraft comprising:
a flight control computer;
an actuator communicably coupled to the flight control computer;
a probe communicably coupled to the flight control computer and configured to provide probe data to the flight control computer; and
one or more cockpit controls,
wherein the flight control computer is configured to:
receive the probe data from the probe;
receive control inputs from the one or more cockpit controls and determine commanded actuator positions;
calculate a measured airspeed based on the probe data;
calculate an estimated airspeed based on the commanded actuator positions;
determine a first fade value based on the measured airspeed;
determine a second fade value based on the estimated airspeed;
determine a blended airspeed based on the measured airspeed, the estimated airspeed, the first fade value, and the second fade value; and
control the actuator based at least in part on the blended airspeed.

12. The rotary wing aircraft of claim 11, further comprising a rotor and a propulsor, wherein the flight control computer is further configured to control one or more of a rotational rotor speed or a rotational propulsor speed based in part on the blended airspeed.

13. The rotary wing aircraft of claim 11, wherein:
in a first airspeed range, the first fade value is a first value and the second fade value is a second value, wherein the first value is lower than the second value;
in a first transition airspeed range, the first fade value increases from the first value to a third value as airspeed increases;
in a second transition airspeed range, the second fade value decreases from the second value to a fourth value as airspeed increases;
in a third airspeed range, the first fade value is the third value and the second fade value is the second value; and
in a second airspeed range, the first fade value is the third value and the second fade value is the fourth value, wherein the fourth value is lower than the second value,
wherein the first transition airspeed range is a range of airspeeds above the first airspeed range, the third airspeed range is a range of airspeeds above the first transition airspeed range, the second transition airspeed range is a range of airspeeds above the third airspeed range, and the second airspeed range is a range of airspeeds above the second transition airspeed range.

14. The rotary wing aircraft of claim 11, wherein controlling the actuator comprises sending an electrical signal to instruct the actuator to adjust a position of the actuator.

15. A flight control computer for controlling one or more components of a rotary wing aircraft, the flight control computer comprising:
one or more processors communicated with one or more non-transitory computer-readable media configured to store fade value data,
the one or more non-transitory computer-readable media storing instructions that, when executed by the one or more processors, cause the one or more processors to perform operations comprising:
determining a measured airspeed based on at least pitot probe data;
determining an estimated airspeed based on at least swashplate position sensor data;
determining a first fade value associated with the measured airspeed based at least in part on the fade value data stored in the one or more non-transitory computer-readable media;
determining a second fade value associated with the estimated airspeed based at least in part on the fade value data stored in the one or more non-transitory computer-readable media;
calculating a blended airspeed based on the measured airspeed, the first fade value, the estimated airspeed, and the second fade value; and
controlling one or more actuators of the rotary wing aircraft based on the blended airspeed.

16. The flight control computer of claim 15, wherein the instructions further cause the one or more processors to perform operations comprising providing the blended airspeed to a health and usage monitoring system of the rotary wing aircraft.

17. The flight control computer of claim 15, further comprising adjusting at least one of a control schedule or a control mode.

18. The flight control computer of claim 15, wherein controlling the one or more actuators of the rotary wing aircraft comprises sending an electrical signal instructing the one or more actuators of the rotary wing aircraft to adjust a position of the one or more actuators.

19. The flight control computer of claim 15, wherein:
the first fade value is determined based on the estimated airspeed; and
the second fade value is determined based on the measured airspeed.

\* \* \* \* \*